Feb. 11, 1969 P. R. L. MARTY ET AL 3,427,604

SELECTION SYSTEM FOR ELECTRICAL CIRCUITS OR EQUIPMENT

Filed Nov. 20, 1964 Sheet 1 of 3

Feb. 11, 1969 P. R. L. MARTY ET AL 3,427,604

SELECTION SYSTEM FOR ELECTRICAL CIRCUITS OR EQUIPMENT

Filed Nov. 20, 1964 Sheet 2 of 3

United States Patent Office 3,427,604
Patented Feb. 11, 1969

3,427,604

SELECTION SYSTEM FOR ELECTRICAL CIRCUITS OR EQUIPMENT

Pierre Rene Louis Marty and Stanislas Kobus, Paris, France, assignors to International Standard Electric Corporation, New York, N.Y., a corporation of Delaware Filed Nov. 20, 1964, Ser. No. 413,400
Claims priority, application France, Nov. 21, 1963, 954,539
U.S. Cl. 340—174 11 Claims
Int. Cl. G11b 5/00; H04m 3/00

In some data processing, switching or analogous electronic systems there is sometimes found a group of similar devices which are to be controlled and supervised, in a practically simultaneous way, as from a central point. To this end, a memory block is provided which may consist, for instance, of ferrite toroids and each said similar device is assigned a location or "cell" in the memory, so as to have a means of recording all the information data characterizing its position at a given moment. A logical circuit scans these different memory cells in turn according to a scanning cycle; at each stage of operation, it gathers together the information data contained both in cell and in the corresponding device, then it controls the necessary operations accordingly. In such systems, a free memory cell may be wanted, either for assigning it to a device which has just been put into service or for giving it to a device which requires a second cell, or again for any other reason. One may wait that a free cell is found during the scanning process, but, in some cases, such a wait is inconsistent with the required operating speed. In consequence it is the purpose of the invention to realize a system for pre-selecting rapidly a free cell in a memory.

The invention more particularly applies to dial telephone systems. The French Patent No. 1,297,158, filed on Apr. 25, 1961, by the applicant, was concerned with an automatic telephone exchange of the semi-electronic type, i.e., with an exchange using electromechanical switches for the speech circuit and electronic components such as diodes and transistors for the control and supervision circuits. The said patent delt in particular with the junctors and registers.

In this automatic exchange, the local or feed junctor is placed between the two selection chain circuits on calling-subscriber and called-subscriber sides and its main function is sending tones and the ringing current, current-supplying subsets and holding the two chain circuits which have been seized. Of a simplified design, it includes only the line wires, the relays for delivering the different tones and the ringing current, and the current-supply relays; the other functions usually performed by the feed-junctor are taken over to common equipments realized by means of electronic components. A number of memories consisting of ferrite toroids are assigned each feed-junctor; these more particularly include a sequential circuit whose position characterizes the stage of operation and also elements for keeping record of the subscriber line conditions (line open or looped). A logical circuit, common to a group of feed-junctors, scans the said feed-junctors in turn as well as the toroids whereto they are associated; at each stage of operation, it notes the information data given by the memories and the contacts of the different relays; it draws all useful inferences, controls the necessary operations and puts the memories up-to-date. Since the feed junctors are scanned according to a cycle, a single logical circuit operates in turn on behalf of each of them in accordance with the so-called time division multiplex method. The progress of the scanner is controlled by a chain of binary counters or "address allotter."

Orders elaborated by the logical circuit are written down in a buffer memory till the actual operation of the corresponding relays. This memory may be common to several feed-junctors and then is called a "junctor driver."

Outgoing and incoming junctors are designed according to the same principle as local or feed-junctors and, in a group served by one same logical circuit, there may be found local, outgoing and incoming junctors.

In the patent filed under the Ser. No. 914,634 on Nov. 7, 1962, now French Patent No. 1,354,833 by the applicant and concerning a "Selection system for electrical circuits or equipment," a feed-junctor has not its own toroids as in the preceding case.

When a feed junctor is put into service it is temporarily assigned a set of toroids or "memory cell" by writing its number down in the said cell. Thus, the whole of the toroids is used to better advantage. When the logical circuit scans the cell by means of a first scanner, it reads the number of the feed junctor and directs a second scanner onto the feed junctor. It then is in a position to gather together all the information data which it needs to make a decision. The different memory cells are grouped so as to form "blocks" and scanned one after the other, within each block, during a scanning cycle. On the contrary, the junctors are scanned at the request of the logical circuit, according to the numbers read out in the memory cells.

In the Dutch Patent No. 292,449 filed on May 7, 1963, by the Bell Telephone Manufacturing Company and concerning a "Data processing system," a memory block is provided for serving a group of junctors and consequently for handling a given traffic. An individual logical circuit, particular to each block cyclically scans the various cells of the block but performs only simple operations such as re-writing the read out information. In complicated cases, it refers the matter to a central logical circuit, common to all blocks, which stops the scanning process and does the necessary. An economy of equipment is thus realized while keeping a scanning cycle of reasonable duration.

Immediately on being put into service, a junctor is assigned one or more cells so called "supervisory cells" which will remain engaged till the end of the telephone connection; it is also associated with another cell so called "registering cell" for registering the different digits of the number dialled by the caller, such cell being used only during the call-routing stage of operation and released as soon as the call is established. In some special instances, other cells are provided, e.g., for sending digits in multifrequency codes. There is interest in having these different cells ready for use without any material waiting time in order to expedite the routing of the call and on account of the fact that some exchanges of the "step-by-step" type, which do not have a register, transmit the digits dialled by the caller in a succession without knowing whether the distant exchange equipment can receive them.

One feature of the invention is a system for pre-selecting a free cell rapidly in a memory block, which mainly consists in reserving, within the block, one or more cells for writing down therein a limited number of free addresses.

Another feature of the invention consists in using a single memory cell, called a "pre-selector," divided into several elements which can each contain the address of a free cell, thus enabling reading out all these addresses at one time, the number of such elements being chosen according to the traffic in such a way that, in almost every instance, a free address is available when a call occurs.

Another feature of the invention consists in providing, in every ordinary memory cell or "supervisory" cell, a first toroid or similar device for marking the availability or engagement of this cell and a second toroid for indicating whether this case number is or is not recorded in the preselector.

Another feature of the invention consists in providing in every preselector element, a toroid for indicating whether the said preselector contains or not the number of a free cell, and other toroids for noting such number, a switching device such as a bistable circuit being moreover provided for indicating whether there remain in the preselector at least one element available for recording a cell number therein.

According to another feature of the invention, when the individual logical circuit associated with the memory block finds, during the scanning cycle, a free cell not recorded in the preselector, while there exists as indicated by the bistable circuit position at least one preselector element available, it calls the central logical circuit, the latter stops the scanning cycle, directs the scanner onto the preselector and writes down the cell number read on the address allotter, into a free element of the preselector.

According to another feature of the invention, when the individual logical circuit calls the central logical circuit, the latter immediately acts upon the second toroid of the supervisory cells as though the number of this cell were already recorded in the preselector, such an arrangement preventing the scanner from coming again on the cell in point and thus enabling a gain of time.

According to another feature of the invention the identity of the available preselector element occupying the lowest rank is sent to the central logical circuit, the latter being then in possession of all the necessary indications for routing the free-cell number onto the appropriate element.

According to another feature of the invention, when the central logical circuit wants the number of a free cell in a particular memory block in order to assign such free cell say to a calling junctor it stops the scanning process, gets connected to the individual logical circuit of this block, directs the scanner onto the preselector, consults the elements of the preselector and chooses one element among those containing the number of a free cell, it then records this number and releases the corresponding preselector element; afterwards, it directs the scanner onto the said free cell so as to occupy it and restore the toroid to normal which indicated that the number of the cell was previously recorded in the preselector.

According to another feature of the invention, when the central logical circuit wants the number of a free cell in any block, it stops the scanning process, gets connected to the individual circuits of all the blocks and proceeds, for each of them, as in the preceding case, but it makes its choice among the preselector elements of all these blocks; after having recorded the corresponding free cell number, it remains connected solely to the block which contains the chosen cell and directs the scanner onto this cell in order to occupy it.

According to an alternative of the invention, another feature consists in providing, in each individual logical circuit, a bistable circuit for indicating whether there is available, in the corresponding memory block, at least one preselector element containing a free cell number, the arrangement being so provided that, when the central logical circuit desires a free cell number in any block, it appeals only to the blocks containing at least one free cell number.

The above mentioned and other features and objects of this invention and the manner of obtaining them will become more apparent, and the invention itself will be best understood by reference to the following description of one embodiment of the invention taken in conjunction with the accompanying drawings, in which.

Figure 1:
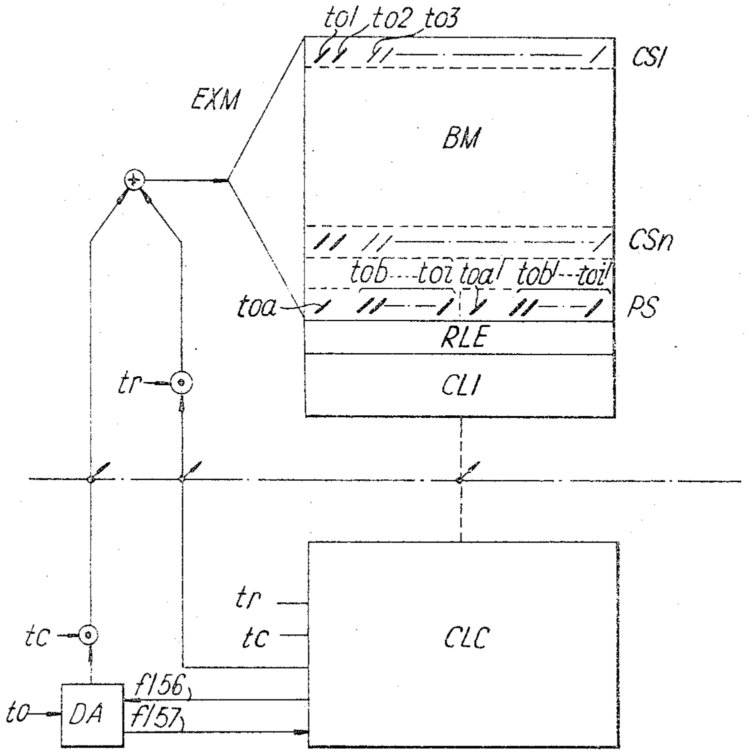
FIG. 1 is the block diagram of the system.

*Symbols.*—The ferrite toroids used in the memory blocks have been represented by means of small slanting strokes (FIG. 1, toroids *to*1, *to*2 . . . ). Heavy strokes have been used for toroids which are part of the invention and light strokes for others.

The electronic scanner associated with each memory block (EXM, FIG. 1) is shown as a triangle; the inlet corresponds to the top which is marked with an arrow and the different outlets are placed on the opposite side.

The gates are shown as small circles containing a dot ("AND" gate) or a cross ("OR" gate) a notation after Boole's algebra.

The bistable circuits such as *dp* (FIG. 2) have been represented by means of two rectangles placed side by side. The inlet wires are placed at the top and bear an arrow showing the incoming direction of the controlling signal; the outlet wires *dp*1 and *dp*0 are placed at the lower part. Normally, this bistable circuit is standing in position 0, a characteristic potential (—12 v. for instance) being delivered on wire *dp*0. In order to have this bistable circuit set in position 1 a control signal is sent on the left hand inlet wire; the characteristic potential then is switched from wire *dp*0 onto wire *dp*1. In order to restore this bistable circuit to normal a control signal is sent onto the right hand inlet wire.

The amplifiers (*ap*1, *ap*2, FIG. 2) are represented by small triangles.

Last, the figures between brackets placed near the wires indicate the number of similar wires.

*Equipment layout.*—Immediately upon being put into service, a junctor is temporarily assigned a free cell memory or supervisory cell, such as CS1 (FIG. 1). This cell mainly consists of a number of ferrite toroids *to*1, *to*2, *to*3 . . . . There is provided in particular a toroid *to*1 which indicates whether the cell is free or busy; on toroids *to*3 and the following ones there are found the number of the junctor associated with the cell, a sequential circuit which indicates the stage of operation, the caller's line condition (open or looped), the called-subscriber's line condition and various other information data. As indicated in the preamble, the junctor is moreover associated with another cell for recording the digits dialled by the caller. The different cells CS1 . . . CS*n* make up a memory block BM. A telephone exchange may include several blocks BM, each being assigned to a given group of junctors. Since all the junctors in a group are not busy at one time, the number of cells in a memory block can be less than the number of junctors. By way of information, one may constitute groups of up to 384 junctors, which corresponds to a traffic of some 2,000 subscriber lines, each group being associated with a memory block of 250 cells.

In each memory block BM, there is reserved a cell PS called a "preselector" for noting free cell numbers. In practice, to handle the traffic satisfactorily, it is sufficient to have at one's disposal two free cell numbers. Cell PS has therefore been divided into two parts. In the left hand part there is found a toroid *toa* for indicating whether this part contains an information or not, and toroids *tob* . . . *toi* for registering a free cell number. In the represented example, 8 toroids have been provided for which afford $2^8=256$ combinations and enable writing the number of a free cell within the block. The second part of the preselector consists of toroids *toa'*, *tob'* . . . *toi'* which fulfil the same junctions as toroids *toa, tob* . . . *toi* respectively. When a free cell number is written down in one of the two halves of preselector PS, toroid *to*2 of this cell is set in position 1.

In order to scan the different cells of memory block BM there is provided an address allotter DA which mainly consists of a chain of several binary counters such as bistable circuits, each of them causing the next one to progress by one step when it comes back to normal. Under these conditions, there can be obtained $2^n$ combinations by using only *n* binary counters. Impulses *t*0 ensure the progression of the first counter of the chain.

The binary indications delivered by the address allotter are decoded by any well known and currently used means, such as diode or resistor matrices, so as to have one characteristic potential appear on a definite wire for each position 7 the address allotter. This decoding arrangement constitutes the scanner EXM. As a rule, this scanner progresses step by step under the control of the address allotter which means that it scans the different memory cells one after the other during a scanning cycle, but it can also be directed onto a given cell by a code delivered by the central logical circuit CLC.

The reading and writing register RLE mainly consists of bistable circuits; for each position of scanner EXM, it leaves a record of the binary code information having been read out or which is to be written, in the corresponding cell.

The individual logical circuit CLI belongs in particular to each memory block. For each position of scanner EXM, it notes the indications recorded in register RLE. If no particular operation is to be made, it just controls the read out information to be merely re-written, but if a particular operation is to be made, it refers the matters to the control logical circuit CLC.

The control logical circuit CLC is common to all the memory blocks BM in the office. It can get temporarily connected to one of them. It then takes notice of all necessary information data and elaborates the appropriate commands.

Figure 2:
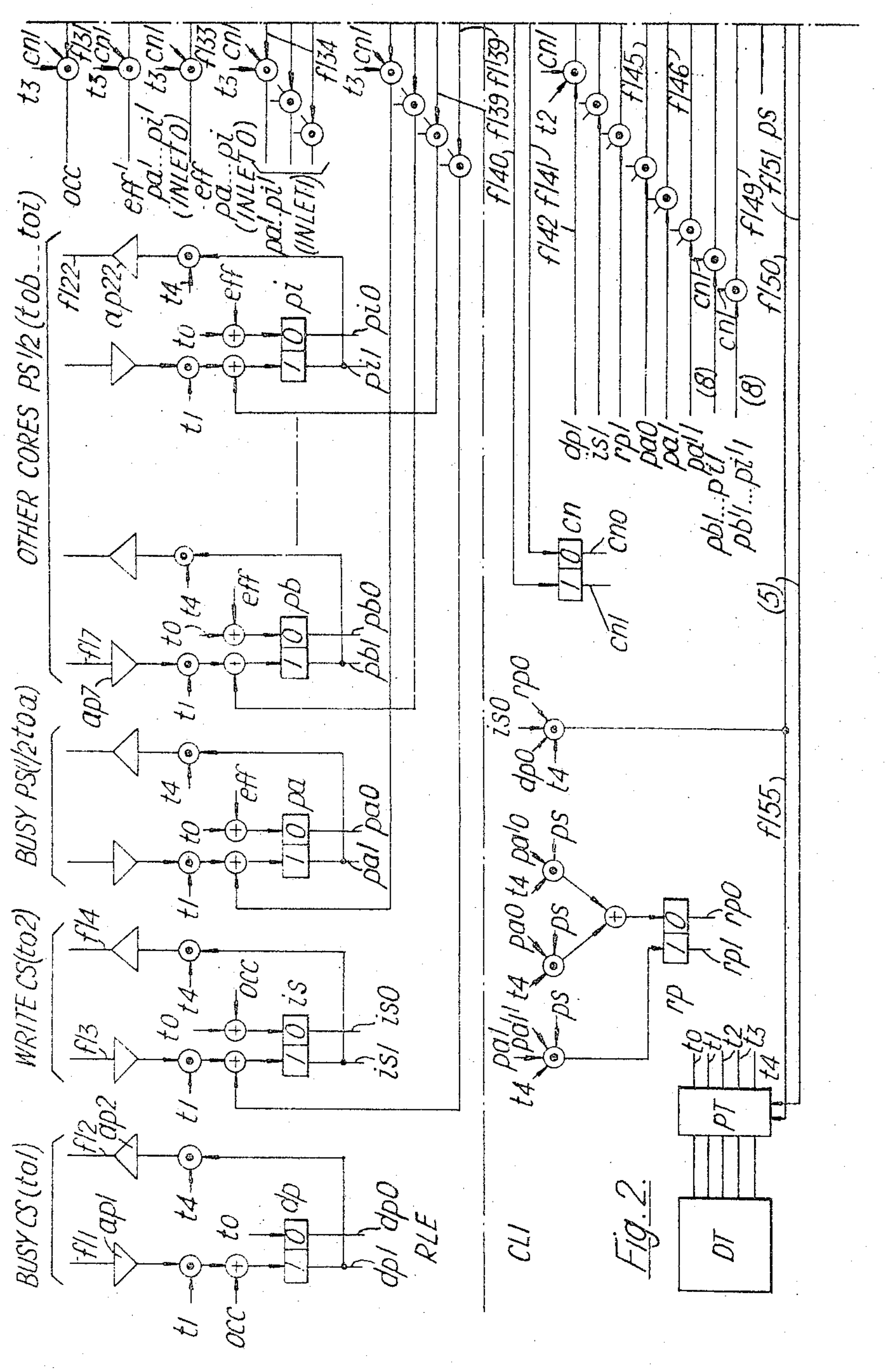
FIG. 2 represents the circuit elements necessary for a good understanding of the invention, the elements of the reading and writing register and of the individual logical circuit.
Figure 3:
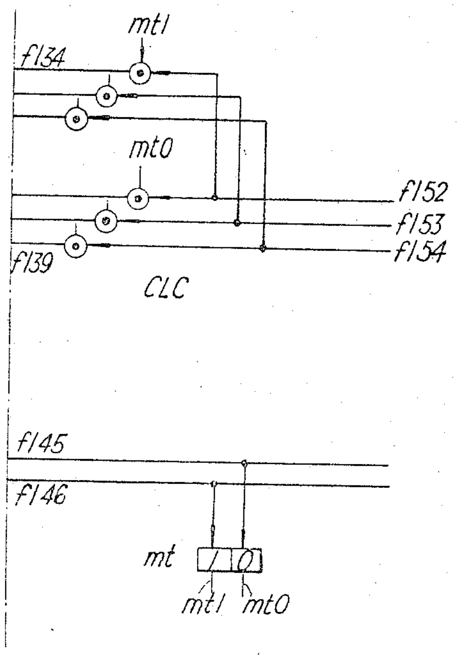
FIG. 3 shows a few elements of the central logical circuit.
Figure 4:
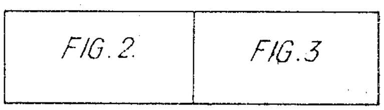
FIG. 4 is an assembly view of FIGURES 2 and 3.

On FIGS. 2 and 3, assembled as indicated by FIG. 4, there have been shown the circuit elements necessary for a good understanding of the invention, the elements of the reading and writing register RLE, of the individual logical circuit CLI and of the central logical circuit CLC. Wires such as *fl*1 and *fl*2, placed at the top of the figure are connected up to the memory block. Wire *fl*1 is used for reading toroid *to*1 of the cell pointed out by the scanner; wire *fl*2 is used for writing an information on this said toroid. Amplifiers *ap*1, *ap*2 are introduced on these two wires respectively. The bistable circuit *dp* leaves a record of the information read out or to be written, on this toroid. A similar arrangement is provided for the circuits corresponding to toroids *to*2, *toa, tob* . . . *toi*. For the sake of clarity, only the circuits corresponding to the first half of the preselector have been represented; bistables *pa', pb'* . . . *pi'* not represented in the figures are provided for the second half of the preselector and fulfil the same functions as bistables *pa, pb* . . . *pi* respectively.

Wires *fl*42 . . . *fl*49 are provided for transmitting information from the individual logical circuit CLI to the central logical circuit CLC; wires *fl*31 . . . *fl*39, *fl'*39 are provided for transmitting orders elaborated by the central logical circuit.

Figure 5:
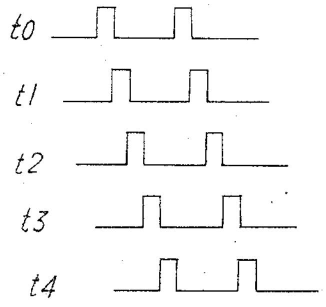
FIG. 5 is the diagram of the controlling impulses delivered by the time allotter.

The different operations which must be performed on each memory cell are timed by a time allotter DT. The latter delivers impulses shifted with regard to one another at time frames *t*0 . . . *t*4 (FIG. 5). Time frame *t*0 is used to restore the reading and writing bistable circuits to normal; time frame *t*1 serves for the reading out; at time frame *t*2 information data are sent to the central logical circuit; time frame *t*3 serves for the reception of commands sent by the central logical circuit; last, time frame *t*4, is reserved for the writing operations and also for calling the central logical circuit. Impulses *t*0 . . . *t*4 are delivered through gates PT placed under the control of the central logical circuit.

Between time frame *t*2 when the central logical circuit receives an information and time frame *t*3 when it sends a command to the individual logical circuit, it must perform different operations aiming at elaborating the command. To this end, it lets a full cycle of the time allotter to elapse and thus has time frames *t*3, *t*4, *t*0, *t*1, *t*2 at its disposal.

By way of information, the duration of each impulse *t*0 . . . *t*4 may be of 4 microseconds which gives a cycle of $4\times5=20$ microseconds for the time allotter. The scanner of address DA (FIG. 1) steps once at each impulse *t*0 i.e., every time the time allotter DT starts a new cycle.

*Writing a free address in the preselector.*—It will be assumed first that the two halves of the preselector contain no address; bistable circuit *rp* (FIG. 2) then is in position 0.

The central logical circuit CLC supplies condition *tc* (FIG. 1), thus rendering conducting the "AND" gate placed above the scanner of address DA; the latter then acts upon scanner EXM which progresses step by step.

A free supervisory cell such as CS1 is characterized by the position of its toroid *to*1 in 0; if the address of this cell is not noted in the preselector, its toroid *to*2 is also standing in position 0. When scanner EXM reaches such a cell, time allotter DT (FIG. 2) delivers in succession the control impulses *t*0 . . . *t*4. Gates PT are assumed to be conducting. Impulse *t*0 causes the reading bistable circuits *dp* and *is* to be reset to 0. At time frame *t*1, the "AND" gate associated with the reading wire *fl*1 is rendered conductive in order to reproduce the position of toroid *to*1 on bistable circuit *dp*; this toroid being in position 0, *dp* remains in 0. In a likewise manner, bistable circuit *is* remains in position 0. At time frame *t*4, the "AND" gates inserted on writing wires *fl*2, *fl*4 are rendered conducting; thereby the respective positions of bistable circuits *dp* and *is* are reproduced respectively on toroids *to*1 and *to*2 which thus remain in 0. At the same time, the central logical circuit CLC is called through an "AND" gate rendered conducting by conditions *t*4, *dp*0, *is*0, *rp*0 and wire *fl*50.

The signal for calling the central logical circuit is used also for blocking gates PT via wire *fl*55. Generally speaking, the control impulses *t*0 . . . *t*4 are blocked immediately after calling the central logical circuit; the different switching operations are thus stopped and, more particularly, any change of position of the reading bistable circuits is prevented.

When the central logical circuit gets connected to the individual logical circuit, it acts upon gates PT, through wires *fl*51, so as to ensure the passage of all or part of the control impulses *t*0 . . . *t*4.

The central logical circuit CLC (FIG. 1) stops the address allotter DA on the position under consideration (wire *fl*56). It serves other memory blocks, if required, and then gets connected to the block under consideration; it then causes bistable *cn* (FIG. 2) to be set in 1, via wire *fl*40. By supplying condition *cn*1 this bistable circuit prepares the circuits for exchanging information with the central logical circuit.

The central logical circuit acts upon gates PT (FIG. 2) for restoring conditions *t*2 to *t*4. At time frame *t*2, information concerning the respective positions of bistable circuits *dp, is* and *rp* are sent to the central logical circuit via wires *dp*1, *is*1, *rp*1 and gates rendered conducting by conditions *t*2 and *cn*1. The said logical circuit knows then that there is a free address to be written down (bistable circuits *dp* and *is* in 0) and that at least one free location is available in the preselector (bistable circuit *rp* in 0).

At time frame *t*3, the central logical circuit sends a command on wire *fl'*39 in order to cause bistable circuit *is* to get in position 1, the state of this bistable circuit being afterwards reproduced on the corresponding toroid *to*2 at time frame *t*4.Toroid *to*2 is therefore set immediately in position 1, although the address of the free cell is not yet registered in the preselector; a gain of time is thus realized.

Afterwards, the central logical circuit removes condition *tc* (FIG. 1), supplies condition *tr* and then sends a suitable code onto scanner EXM so as to direct the latter onto preselector PS. At the same time, it renders gates PT (FIG. 2) conducting so as to restore all the conditions *t*0 . . . *t*4.

At time frame *t*0, bistable circuits *pa, pb* . . . *pi, pa', pb'* . . . *pi'* are reset in position 0 (these bistable circuits corresponding, as indicated, to the second half of the preselector). At time frame *t*1, the positions of toroids *toa* and *toa'* are reproduced respectively on bistable circuits *pa* and *pa'*. Although toroid *toa* is the first one of the cell, on FIG. 1, it will be understood that as a matter of fact it is preceded by two toroids which are not used, so that it will correspond to bistable *pa*. Since it was assumed at the beginning that the two preselector halves were empty, those two bistable circuits remain in position 0. At time frame *t*2 a command is sent to the central logical circuit, through wire *pa*0 and an "AND" gate rendered conducting by conditions *t*2 and *cn*1, so as to place the routing bistable circuit *mt* in position 0.

The central logical circuit then lets a full cycle of the time allotter to elapse (time frames *t*3, *t*4, *t*0, *t*1, *t*2) and turns this time to account by performing a number of operations; in particular, it reads the code recorded on the address allotter DA (wire *fl*57, FIG. 1), which is none other but the number of the free cell CS1.

At the next time frame *t*3, it gives the free-cell address to bistable circuits *pb* . . . *pi* through wires *fl*53, *fl*54, "AND" gates made conducting by condition *mto*, "AND" gates made conducting by conditions *t*3, *cn*1 and "OR" gates. At the same time, it causes bistable *pa* to be set in 1, via wire *fl*52. At time frame *t*4, the respective positions of bistable circuits *pa, pb, pi* are reproduced on corresponding toroids *toa, tob* . . . *tom*. The free cell address is therefore written in the first half of the preselector and this half is marked busy by its toroid *toa* which is set in 1.

The central logical circuit then disconnects itself from the memory block in point by causing bistable circuit *cn* to be set in position 0 (wire *fl*41). It serves other blocks if necessary and then causes the scanning process to start again by removing condition *tr* (FIG. 1), restoring condition *tc* and sending a suitable command on wire *fl*56.

In the event the first half of the preselector already contains the number of a free cell, the bistable *rp* is always standing in position 0 and the central logical circuit is called as in the preceding case. However, when reading the occupancy toroids *toa, toa', pa* is set in 1 and *pa'* in 0. Thereby, the routing bistable circuit *mt* is set in position 1 so as to prepare writing of the free cell number on the second half of the preselector. At time frame *t*3 of the following cycle the central logical circuit sends the free cell number onto bistable circuits *pb'* . . . *pi'* (not shown on the figures) via wires *fl*53, *fl*54, "AND" gates rendered conducting by condition *mt*1, "AND" gates rendered conducting by conditions *t*3 and *on*1. The bistable circuit *pa'* is set in 1 via a similar circuit. At time frame *t*4, the states of bistable circuits *pa', pb'* . . . *pi* are reproduced on the toroids of the second half of the preselector.

At time frame *t*4 the bistable circuit *rp* is set in 1, via an "AND" gate rendered conducting by conditions *t*4, *pa*1, *pa'*1, *ps*. This indicates that both halves of the preselector are busy; condition *rpo* is removed and it is no longer possible to appeal to the central logical circuit even if a new free cell is found; the number of such free cell is therefore not recorded. Condition *ps* is delivered by the central logical circuit only when the latter operates with the preselector; its purpose is preventing any untimely action on bistable circuit *rp* in the other cases of operation.

*Reading an address written in the preselector.*—When the central logical circuit wants a free cell in a particular block, so as to assign it say to a junctor having just been put into service, it stops the scanning in process (wire *fl*56, FIG. 1). It then gets connected to the individual logical circuit CLI of the block under consideration by setting its bistable circuit *cn* in position 1 (wire *fl*40, FIG. 2); it removes condition *tc* (FIG. 1) and supplies condition *tr* in order to direct scanner EXM on preselector PS. Finally, it opens gates PT (wire *fl*51, FIG. 2) so as to provide a passage for the control impulses *t*0 . . . *t*4.

At time frame *t*0, all the preselector reading bistable circuits *pa, pb* . . . *pi, pa', pb'* . . . *pi'* are restored to 0. At time frame *t*1, the positions of toroids *toa, tob* . . . *toi, toa', tob'* . . . *toi'* are reproduced on the corresponding bistable circuits. At time frame *t*2, indications concerning the positions of bistable circuits *pa, pa'* are sent to the central logical circuit, via wires *pa*1, *pa'*1 and "AND" gates rendered conducting by conditions *t*2 and *cn*1. At time frame *t*4, the information read out are written back in the preselector. The central logical circuit blocks gates PT (wire *fl*51) in order to remove conditions *t*0, *t*1, *t*3, *t*4.

The central logical circuit scans in turn the information data sent over wires *pa*1, *pa'*1. If the information on wire *pa*1 says that bistable circuit *pa* stands in 1, it infers that the first half of the preselector contains the address of a free cell; it chooses this half part and registers the corresponding address by means of wires *pb*1 . . . *pi*1. To perform these various operations, it has time frames *t*3, *t*4 of the previous cycle and time frames *t*0, *t*1, *t*2 of the next succeeding cycle at its disposal. For obtaining such operating process, the "AND" gates placed along wires *pb*1 . . . *pi*1 are controlled only by condition *cn*1 and not by condition *t*2.

When the information sent over wire *pa*1 indicates that bistable circuit *pa* stands in 0, the central logical circuit scans the information transmitted on wire *pa'*1. If the latter says that the bistable circuit *pa'* stands in 1, the central logical circuit infers that the second half of the preselector contains the address of a free cell; it chooses this half and the following operations take place as in the preceding case.

A preselector that would contain no free cell number would practically be of no interest. The speed of the scanner and the rate at which calls are incoming are such that the free addresses are written down quite before they are used. Nevertheless, should any such case occur, the central logical circuit would cause the scanning process to be started anew and it would be waited that the scanner has run a full cycle before resuming the finding out process.

It will be assumed in the following that the central logical circuit registers the address found in the first half of the preselector.

The central logical circuit then acts upon gates PT in order to restore conditions *t*3 and *t*4. At time frame *t*3, it sends a command, over wire *fl*33, which reaches the cancelling wire *eff* via an "AND" gate rendered conducting by conditions *t*3 and *cn*1. Wire *eff* being connected to inlets 0 of bistable circuits *pa, pb* . . . *pi* through "OR" gates, these bistable circuits are restored to 0. On the other hand, bistable circuits *pa', pb'* . . . *pi'* corresponding to the second half of the preselector remain on the position under consideration. At time frame *t*4, the states of the different bistable circuits are reproduced on the corresponding toroids; those of the first preselector-half remain in 0 and those of the second half return to their initial state. The first half of the preselector is thus released and can receive the number of another free cell.

At time frame *t*4, bistable circuit *rp* is set in 0 via an "AND" gate rendered conducting by conditions *t*4, *pa*0, *ps* and an "OR" gate; this indicates that at least one location is free in the preselector.

The central logical circuit CLC (FIG. 1) then directs the scanner EXM onto the cell whose address it has memorized. It will be assumed that this cell is CS1. It also acts upon gates PT (FIG. 2) in order to re-establish conditions *t*0 . . . *t*4.

At time frame *t*0, the reading bistable circuits *dp* and *is* are reset to 0. At time frame *t*1, the states of toroids *to*1, *to*2 are reproduced on bistable circuits *dp*, *is*. Bistable circuit *dp* remains in 0 but *is* changes into 1, since the number of the cell was previously noted in the preselector. At time frame *t*2, the indications on the positions of bistable circuits *dp*, *is* are sent to the central logical circuit via wires *dp*1, *is*1 and gates rendered conducting by conditions *t*2, *in*1; the said logical circuit is therefore able to check that it has found a free cell whose number was previously registered in the preselector. At time frame *t*3 of the following cycle the central logical circuit sends a command on the occupancy wire *occ* via "AND" gate rendered conducting by condition *t*3 and *cn*1; wire *occ* being connected to inlet 1 of bistable circuit *dp* and, on the other hand, to inlet 0 of bistable circuit *is* through "OR" gates, *dp* is set in 1 and *is*, in 0. At time frame *t*4, the states of bistable circuits *dp*, *is* are reproduced on the corresponding toroids *to*1, *to*2; this indicates that the cell is busy and that its number is not noted in the preselector.

The central logical circuit then disconnects itself from the memory lock in point by causing bistable circuit *cn* to change into 0. It serves other memory blocks if required, then it re-starts the scanning process.

We shall deal now with the instance when a free cell is wanted in any memory block. This is the case, for instance, when a second memory cell must be assigned to a junctor for registering the number dialled by the caller. The central logical circuit then connects itself to the individual logical circuits of all the memory blocks in the office. It scans in turn the information data sent over wires *pa*1, *pa'*1 of the different individual logical circuits. As soon as it finds an information which says that a bistable circuit such as *pa* or *pa'*1 stands in 1, it infers that the corresponding half selector contains the number of a free cell; it then registers the address of this cell. The half selector under consideration is released and the others are restored to their initial position. The central logical circuit remains connected to the memory block containing the chosen address so as to occupy the corresponding cell and it disconnects itself from the other blocks. Operations then proceed as in the general case.

According to an alternative, there may be provided in each individual logical circuit a bistable circuit indicating that at least one free cell is available in the preselector. The central logical circuit, in that case, tests only the corresponding memory blocks.

For the sake of clarity, the detailed diagram of the section of the central logical circuit operating in connection with the individual logical circuit has not been represented; such a diagram can be readily realized by any person skilled in the art since we have explicitly indicated, for each stage of operation, the contents of the information sent out and the commands issued in accordance thereof. According to a well known technique, either a wired logic (matrices of diodes or resistors) or a programmed logic (program recorded in advance on ferrite toroids or any other similar recording medium), can be used. Besides the other pieces of equipment represented on the block diagram shown on FIG. 1 (memories, scanners, reading and writing registers, gates) are well known and currently used. It is clearly understood that the preceding descriptions have been made only by way of example and not as limitations to the scope of the invention. The ferrite toroids could well be replaced by memories of another type, a different scanner could be foreseen, other time diagrams could be adopted, etc. More particularly, the various numerical data have been given only to serve as an example, for a better understanding of the operating process, and are liable to change in each particular instance of application.

SUMMARY

The invention relates to a selection system for electrical circuits or equipment and, more particularly, to a system for preselecting rapidly a free cell in a memory block, such system consisting mainly in reserving, within the block, one or more cells for writing therein a limited number of free addresses.

The description discloses an embodiment applicable to a dial telephone system of the semi-electronic type.

We claim:

1. An electronic system comprising a plurality of control circuits for controlling various functions occurring during the operation of other circuits, means comprising memory cells in a memory matrix of magnetic core members for controlling said control circuits, means for recording in a pre-selector addresses of some free memory cells, means for putting a control circuit into service to control a particular one of said other circuits, and means for pre-selecting at least one free cell in said memory matrix to serve the control circuit that is put into service by using one of said recorded addresses of free memory cells.

2. The system of claim 1 and means for using as preselector one of said memory cells to store the addresses of a plurality of free memory cells, thereby providing for a simultaneous read out of a plurality of address registers.

3. The system of claim 2 wherein said pre-selector is divided into a plurality of elements, each one for recording a free cell address, there being a sufficient number of said elements to insure that a free cell address is always available under traffic conditions for a given grade of service.

4. The system of claim 3 and means comprising a core associated with each of said elements for indicating whether said pre-selector element contains a free cell address.

5. The system of claim 4 and means comprising a bistable circuit associated with the pre-selector for indicating whether said pre-selector still has an element which does not contain a free cell address.

6. The system of claim 1 and means comprising a first magnetic core associated with each cell for indicating the busy or idle condition of said associated cell.

7. The system of claim 6 and means comprising a second magnetic core associated with each cell for indicating whether the address of said associated cell is recorded in a pre-selector element.

8. The system of claim 7 and means for scanning said matrix for a free cell, means responsive to the discovery of a free cell the address of which is not recorded in the pre-selector, and means then responsive to the state of said bistable circuit indicating that there is at least one pre-selector element not containing a free cell address for stopping said scanning and writing the address of said free cell into one pre-selector element.

9. The system of claim 8 and an individual logic circuit associated with each memory matrix and a central logic circuit, said individual logic circuit comprising means for scanning said matrix for a free cell, means responsive to the discovery of a free cell the address of which is not recorded in the pre-selector, and means then responsive to the state of said bistable circuit indicating that there is at least one pre-selector element not containing a free cell address for stopping said scanning and calling the central logic circuit, said central logic circuit comprising means for writing the address of the free cell into an available element of the pre-selector.

10. The system of claim 9 and means, in the central logic circuit, for acting upon said second magnetic core of the free cell, so as to have it indicate that the address of the cell is recorded into the pre-selector.

11. The system of claim 10 and means, in the central logic circuit, for reading out the pre-selector memory cell and choosing the available element having the lowest rank in order to cause the writing of the address of the free cell in it.

References Cited

UNITED STATES PATENTS 3,316,420 4/1967 Koerner ------------ 340—174

BERNARD KONICK, *Primary Examiner.*

P. SPERBER, *Assistant Examiner.*

U.S. Cl. X.R.

179—18